US012736209B1

(12) United States Patent
Mjelde

(10) Patent No.: US 12,736,209 B1
(45) Date of Patent: Sep. 15, 2026

(54) NICHELESS POOL AND SPA LIGHT

(71) Applicant: AquaStar Pool Products, Inc., Venura, CA (US)

(72) Inventor: Olaf Mjelde, Ventura, CA (US)

(73) Assignee: AQUASTAR POOL PRODUCTS, INC., Ventura, CA (US)

( * ) Notice: Subject to any disclaimer, the term of this patent is extended or adjusted under 35 U.S.C. 154(b) by 0 days.

(21) Appl. No.: 19/431,932

(22) Filed: Dec. 23, 2025

(51) Int. Cl.

| | |
|---|---|
| ***F21V 23/00*** | (2015.01) |
| ***F21V 5/04*** | (2006.01) |
| ***F21V 11/16*** | (2006.01) |
| ***F21V 23/06*** | (2006.01) |
| ***F21V 29/70*** | (2015.01) |
| ***F21V 31/00*** | (2006.01) |
| ***F21V 33/00*** | (2006.01) |
| ***F21W 131/401*** | (2006.01) |
| ***F21Y 115/10*** | (2016.01) |
| ***H05B 45/20*** | (2020.01) |

(52) U.S. Cl.
CPC ............ *F21V 23/006* (2013.01); *F21V 5/043* (2013.01); *F21V 11/16* (2013.01); *F21V 23/06* (2013.01); *F21V 29/70* (2015.01); *F21V 31/005* (2013.01); *F21V 33/008* (2013.01); *H05B 45/20* (2020.01); *F21W 2131/401* (2013.01); *F21Y 2115/10* (2016.08)

(58) Field of Classification Search
CPC ........ F21V 23/006; F21V 29/70; F21V 5/043; F21V 11/16; F21V 23/06; F21V 31/005; F21V 33/008; H05B 45/20
See application file for complete search history.

(56) References Cited

U.S. PATENT DOCUMENTS

| | | | | |
|---|---|---|---|---|
| 4,999,757 | A | 3/1991 | Poppenheimer | |
| 7,722,216 | B2 * | 5/2010 | Amor | F21V 15/01 362/101 |
| 9,285,109 | B1 * | 3/2016 | Olsson | F21V 29/70 |
| D761,453 | S | 7/2016 | Sorokin | |
| 9,464,794 | B2 * | 10/2016 | Masterman | F21V 5/04 |
| 9,835,298 | B2 | 12/2017 | Doyle | |
| 9,863,629 | B2 | 1/2018 | Doyle | |
| 10,077,894 | B2 | 9/2018 | Mjelde | |

(Continued)

FOREIGN PATENT DOCUMENTS

| | | |
|---|---|---|
| CN | 209054461 | 7/2019 |

OTHER PUBLICATIONS

Hayward LED Pool and Spa Light, Mar. 15, 2015, Amazon, site visited Jan. 28, 2026, URL: https://www.amazon.ca/dp/ BOOOJNE19K?th=1 (Year: 2015); 3 pages.

(Continued)

*Primary Examiner* — Bryon T Gyllstrom
(74) *Attorney, Agent, or Firm* — Cislo & Thomas LLP

(57) ABSTRACT

An accent or nicheless light specifically configured for installation within swimming-pool plumbing conduits is provided. The light utilizes solid-state lighting elements such as LEDs and incorporates an integrated arrangement of a display board containing the LEDs, a driver circuit board, a heat sink, and a housing containing a heat-dissipating structure. The nicheless light is capable of providing either accent illumination or functional lighting in locations where conventional pool lights are impractical. Decorative effects may also be provided through the use of color changing LEDs.

19 Claims, 9 Drawing Sheets

(56) References Cited

U.S. PATENT DOCUMENTS

| | | | | |
|---|---|---|---|---|
| 11,619,377 | B2 * | 4/2023 | Potucek | F21V 31/005 362/267 |
| D1,033,720 | S | 7/2024 | Walker | |
| 12,031,709 | B2 * | 7/2024 | De Boer | F21V 31/005 |
| 12,158,262 | B1 | 12/2024 | Doyle | |
| D1,102,632 | S | 11/2025 | Berlitz | |
| 12,553,599 | B2 | 2/2026 | Doyle | |
| D1,123,229 | S | 4/2026 | Gold | |
| 2004/0223320 | A1 | 11/2004 | Archer | |
| 2015/0092416 | A1 * | 4/2015 | Potucek | F21V 31/005 362/267 |
| 2018/0231189 | A1 * | 8/2018 | Guo | F21V 29/507 |
| 2019/0107274 | A1 | 4/2019 | Arpin | |
| 2021/0301547 | A1 | 9/2021 | Svendsen | |
| 2022/0214020 | A1 | 7/2022 | Vogtner | |
| 2023/0194075 | A1 | 6/2023 | Duran | |
| 2023/0243497 | A1 | 8/2023 | Duran | |
| 2023/0265997 | A1 * | 8/2023 | Arpin | F21V 23/006 362/267 |
| 2024/0026700 | A1 | 1/2024 | Bauckman et al. | |

OTHER PUBLICATIONS

Spectrum Nicheless LED Pool and Spa Light, Oct. 12, 2022, You Tube, site visited Jan. 28, 2026, URL: https://www.youtube.com/watch?v=OleJ DGCtoyk (Year: 2022); 4 pages.

AquaChrome LED Pool Light—Nicheless Replacement, Jan. 15, 2025, Amazon, site visited Jan. 28, 2026, URL: https://wwwamazon.ca/dp/BODT4TSSBR?th=1 (Year: 2025); 8 pages.

* cited by examiner

NICHELESS POOL AND SPA LIGHT

FIELD OF THE INVENTION

The present invention relates generally to lighting devices for swimming pools and spas and, more particularly, to compact accent lighting fixtures configured for installation within small-diameter swimming pool plumbing conduits. The invention specifically concerns LED-based lighting units adapted to fit within pipes of about 1.5 to 2 inches in diameter while providing for reliable waterproof operation and functional or decorative lighting effects.

BACKGROUND OF THE INVENTION

Swimming pools and spas increasingly incorporate lighting systems to enhance aesthetic appeal, improve visibility, and create dynamic illumination effects. Traditional pool lighting solutions commonly utilize large niche-mounted fixtures installed within the pool wall. These systems require substantial installation space, complex housings, and often necessitate draining or partially draining the pool for maintenance or replacement. As a result, they can be costly, intrusive, and difficult to retrofit into existing pool structures.

To address these limitations, smaller accent-type lighting devices have been introduced. Such lights are designed to provide localized illumination, highlight architectural features, or contribute to color-changing or decorative lighting schemes. Many of these accent lights are intended to be mounted within conduits or return lines that already exist within the pool infrastructure, reducing installation complexity. However, conventional small-format pool lights often suffer from limited brightness, poor sealing reliability, inefficient thermal management, and difficulty accommodating electrical components in the constrained space of standard plumbing pipes.

Standard pool plumbing typically includes pipes having diameters of approximately 1.5 to 2 inches. Designing a lighting fixture capable of fitting securely within such narrow conduits while still delivering robust waterproofing, adequate heat dissipation, and stable electrical performance presents significant engineering challenges. Additionally, improvements in lighting efficiency, longevity, and color-control capability have increased interest in incorporating modern solid-state lighting technology, particularly light-emitting diodes (LEDs) into these compact fixtures.

While LEDs offer substantial advantages, including low power consumption, long operational life, and versatility in light output, their integration into small, fully submerged housings requires sophisticated optical, structural, and thermal solutions.

Accordingly, there remains a need for an improved accent lighting device for swimming pools and similar installations that can be easily installed into small-diameter pipes, provides reliable waterproof operation, efficiently integrates LED lighting elements, and delivers enhanced illumination performance within the spatial and environmental constraints of submerged pool infrastructure.

SUMMARY OF THE INVENTION

The present invention provides a compact submergible or nicheless light specifically configured for installation within swimming-pool plumbing conduits, which typically range from about 1.50 to 2 inches in diameter. The device utilizes light sources such as LEDs and incorporates an arrangement of a display circuit board containing the LEDs, a driver circuit board, a heat sink, and a housing containing a heat-dissipating structure.

At a front end of the housing, the LEDs face outwardly and are sealed against water intrusion by a lens. At a rear end, the housing is configured to mate with an electrical connector suitable for submerged operation. The housing is filled or potted with a thermally conductive resin to seal the internal electrical components from water intrusion and to improve heat dissipation. The nicheless light of the present invention is mounted internally within a pipe or conduit via an adapter fitting. The nicheless light is configured to accept removably attachable shrouds, such as, for example, a down-shroud for illumination of pool steps or bottom surfaces.

The nicheless light of the present invention provides a robust, easily installed lighting solution capable of delivering either accent illumination or functional lighting in locations where conventional pool lights are impractical. Decorative effects may also be provided through the use of color changing LEDs.

The nicheless light of the present invention thus provides an improved compact LED lighting unit that can be installed within pool plumbing lines, offers reliable waterproof performance, and delivers enhanced lighting output and thermal management in a minimal footprint.

The above and other features and advantages of the present invention will become apparent from the following detailed description, taken in conjunction with the accompanying drawings.

DETAILED DESCRIPTION OF THE PREFERRED EMBODIMENTS

Figure 1:
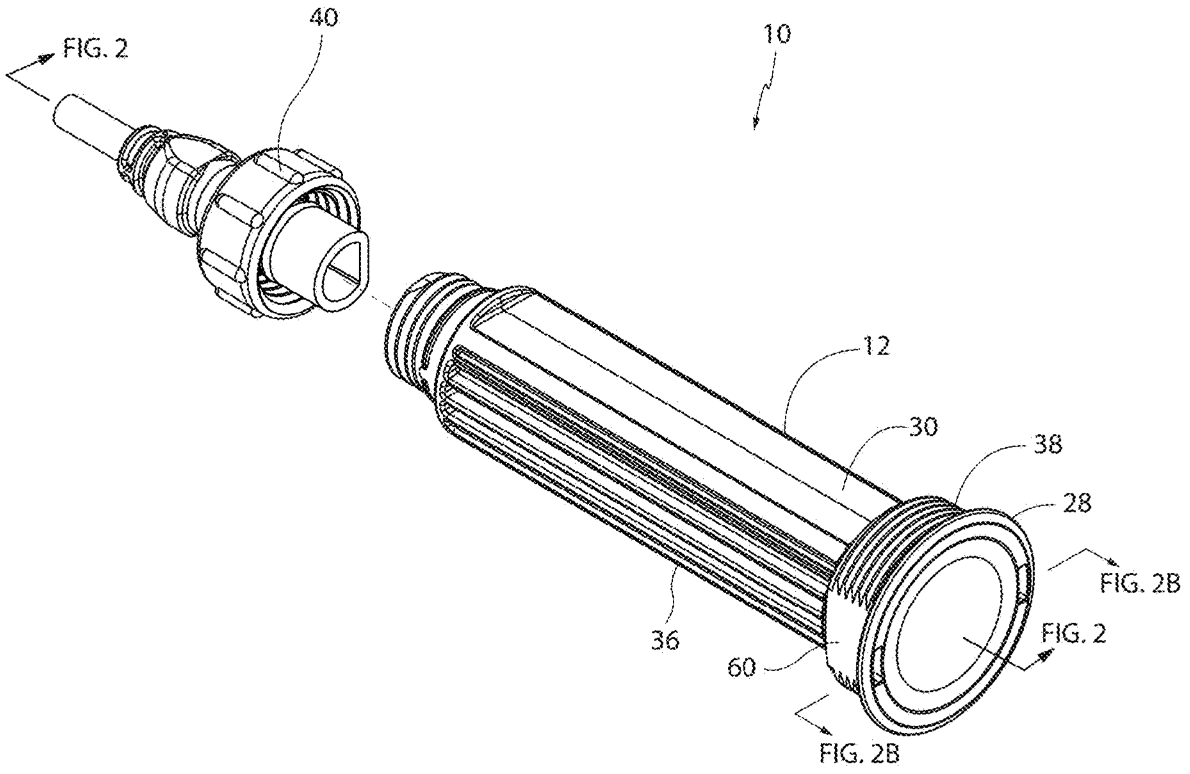
FIG. 1 is a perspective view of the submergible or nicheless light of the present invention.

The present invention will now be described more fully hereinafter with reference to the accompanying drawings, in which preferred embodiments of the invention are shown. The invention may, however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

The following detailed description refers to illustrative embodiments of an accent or nicheless light for use in swimming pools and spas. The embodiments described herein are provided as examples and are not intended to limit the scope of the invention.

With reference to FIGS. 1-6, the submergible or nicheless light 10 of the present invention comprises a housing 12, a display or first circuit board 14 containing one or more LEDs or light sources 16, a driver or second circuit board 18, a heat sink 20 and a lens 28. The housing 12 is a generally, an elongated body having a front end 44 and a rear end 42 with an interior space or cavity 48, formed therebetween. The front end 44 of the housing 12 is configured to accept the lens 28 and the rear end 42 is configured to include a receptacle 52 for a connector and external threads 54, which allow the housing 12 to accept a removably attachable electrical connector 40. One suitable connector for use with the nicheless light of the present invention is disclosed in U.S. patent Ser. No. 10/077,894 to Olaf Mjelde.

The cavity 48 of the housing 12 is configured with two rectangular, internal, heat sink portions 30, spaced approximately 180 degrees apart and which have flat, faces 50 internal to the cavity 48. The heat sink portions 30 improve the ability of the nicheless light 10 to dissipate heat. The housing 12 is also equipped with two external, fluted portions 36, spaced about 180 degrees part that also assist in dissipating heat as well as providing a gripping surface for ease of installation.

The housing 12 is sized to be received within a section of pipe or conduit having an inner diameter of approximately 1.5 to 2 inches. The housing 12 may be formed from a thermally conductive, thermoplastic material. Other polymeric materials, as well as metals or composites, capable of withstanding continuous water exposure are also suitable.

The display board 14 is a PCB board having a front face 82 and a rear face 84. On the front face 82 are installed the light sources or LEDs 16, which may be arranged in linear, circular, or clustered patterns depending on the desired lighting effect. For color-changing embodiments, the display board 14 may include multiple LED dies to provide blended color output. The driver board 18 is a PCB board containing the circuitry necessary to operate the LEDs 16. The driver board 18 may support driving circuitry, voltage regulation components, and optional control electronics such as RGB or RGBW LED controllers. The driver board 18 may use switch-mode control which generates very little heat.

Figure 2:
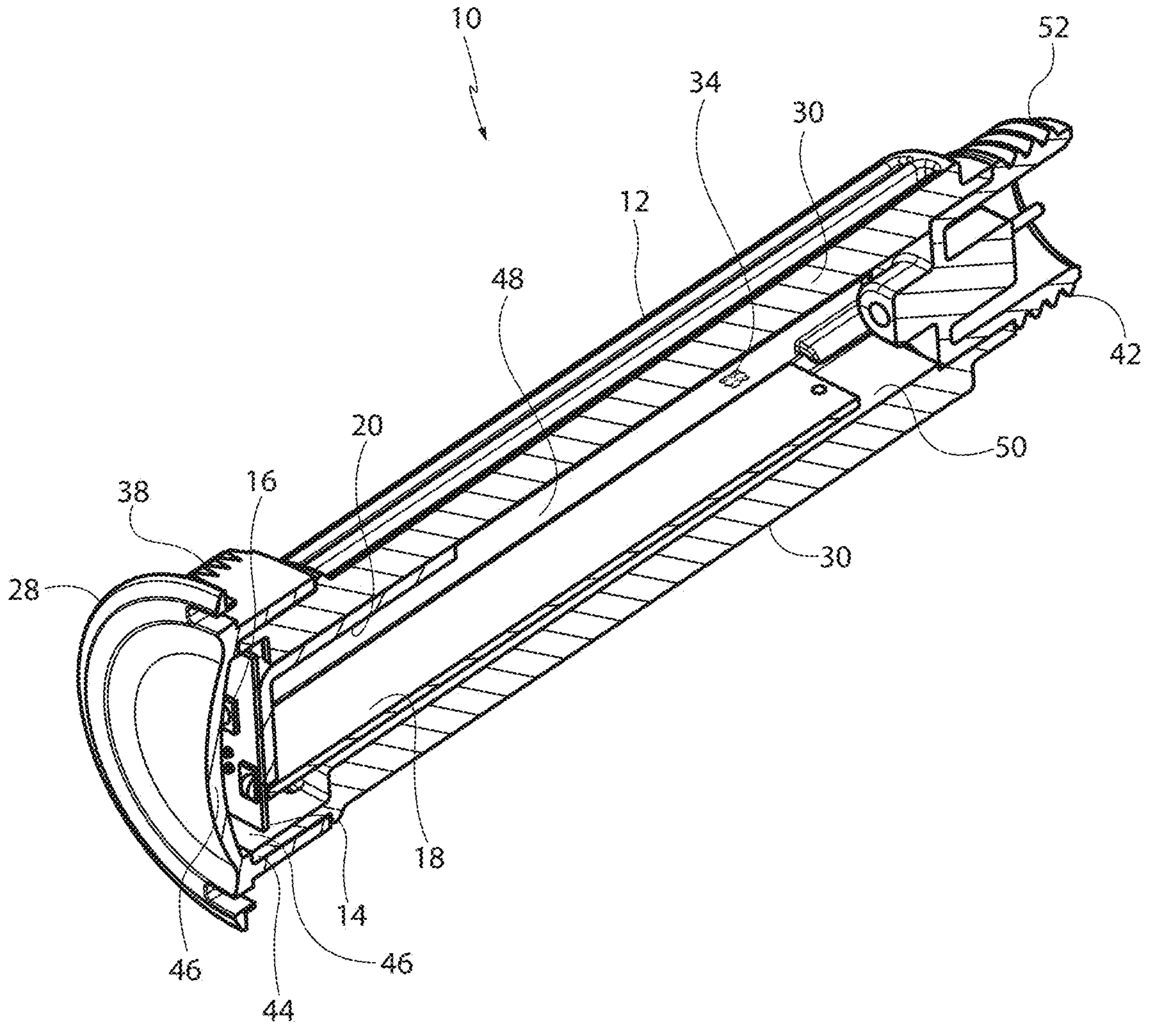
FIG. 2 is a cross-sectional view of the nicheless light taken along the line 2-2 of FIG. 1, showing the arrangement of light's internal components, as well as the heat dissipation features of the housing.
Figure 2A:
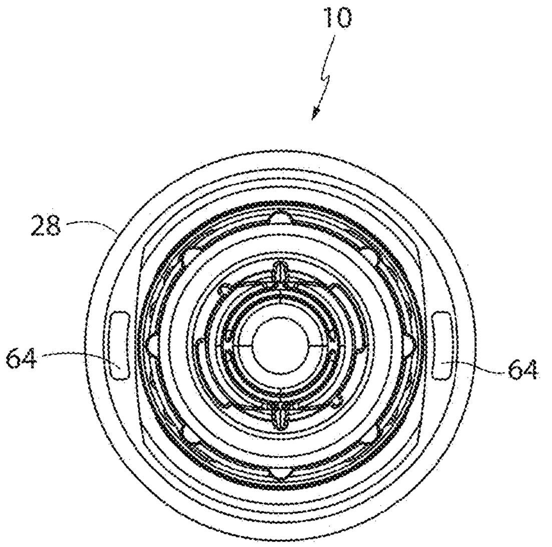
FIG. 2A is a front view of the nicheless light of FIG. 1.
Figure 2B:
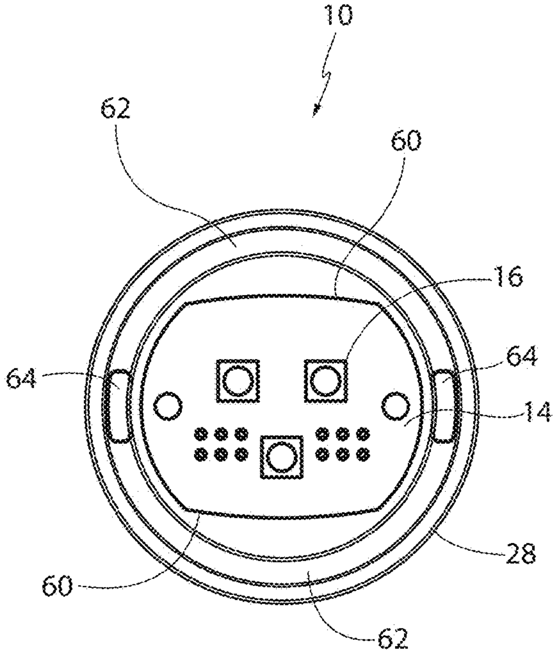
FIG. 2B is a cross-sectional view of the interface between the housing and the lens of the nicheless light of the present invention taken along the line 2*b*-2*b* of FIG. 1, showing flats on the housing and corresponding flats on the lens at the interface.
Figure 3:
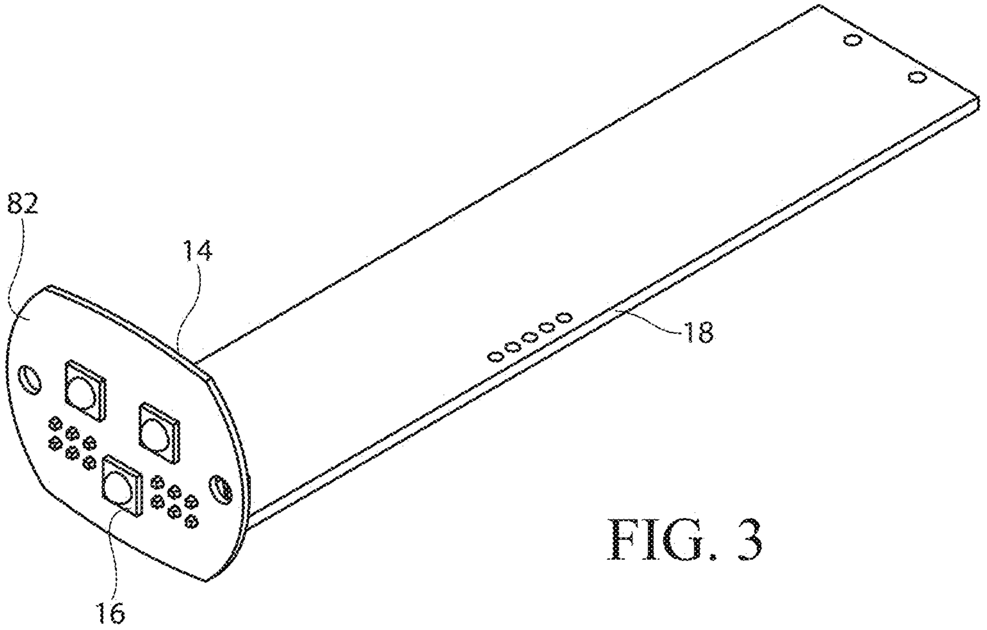
FIG. 3 is a front perspective view of the display board and driver board connection of the nicheless light of FIG. 1.
Figure 4:
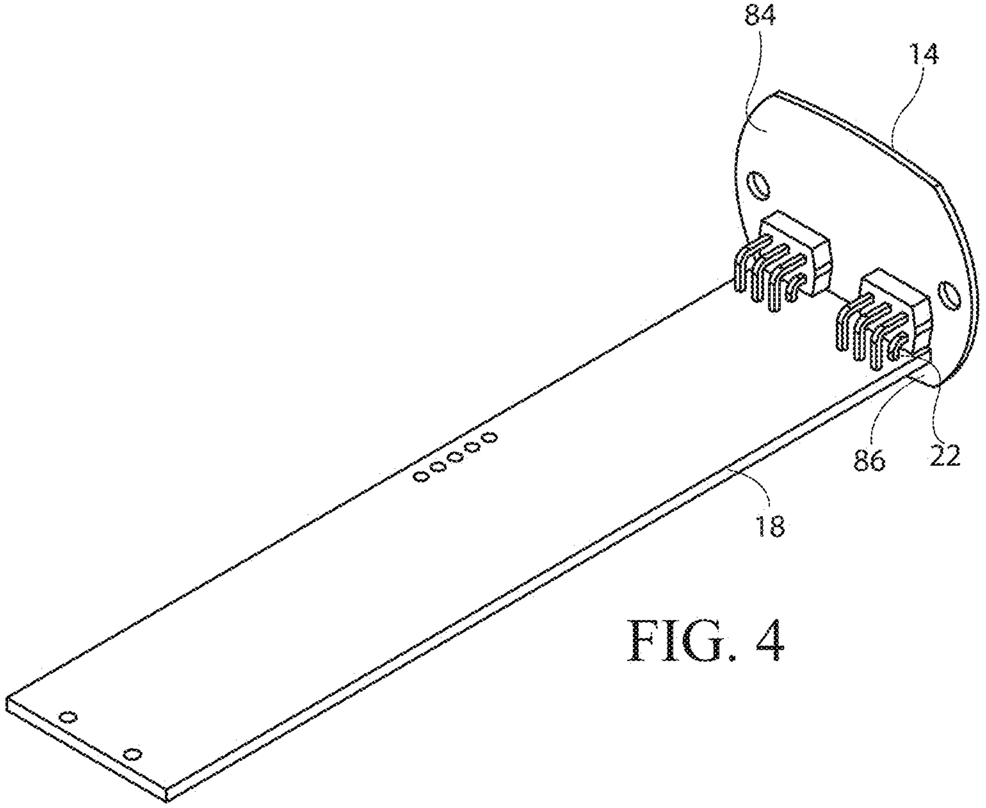
FIG. 4 is a rear perspective view of the display board and driver board connection the nicheless light of FIG. 1.

With reference to FIGS. 1-6 and in particular, reference to FIGS. 3-4, the connection between the display board 14 and the driver board 18 is shown. The driver board 18 is connected to the rear face 84 of the display board 14 adjacent an edge 86 by right angle connectors 22, with the driver board 18 extending perpendicularly from an edge 86 of the rear face 84 of the display board 14.

Figure 5:
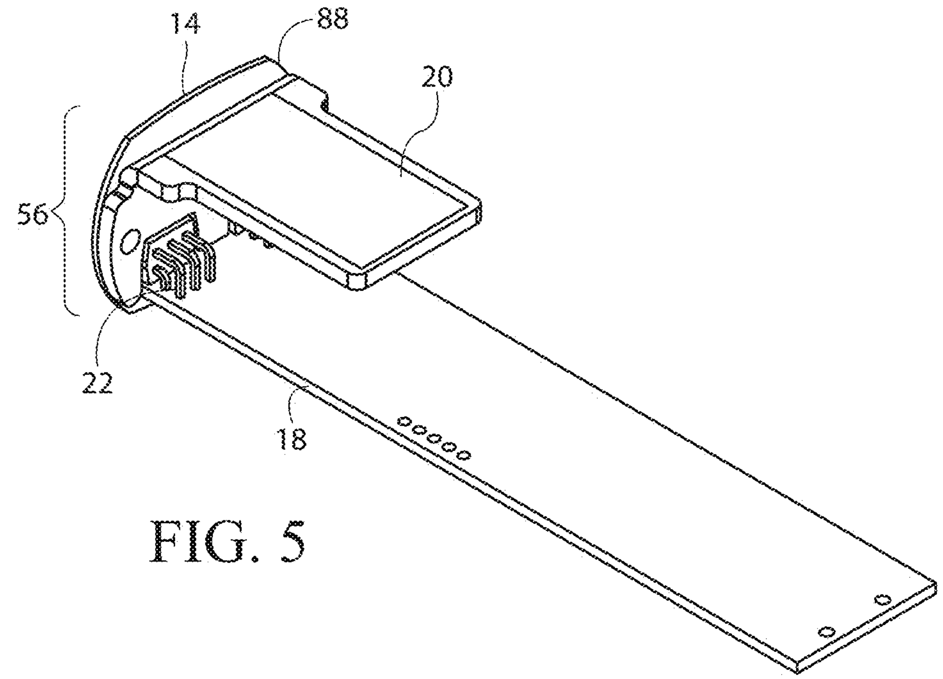
FIG. 5 is a front perspective view of the display board, driver board and heat sink subassembly of the nicheless light of FIG. 1.
Figure 6:
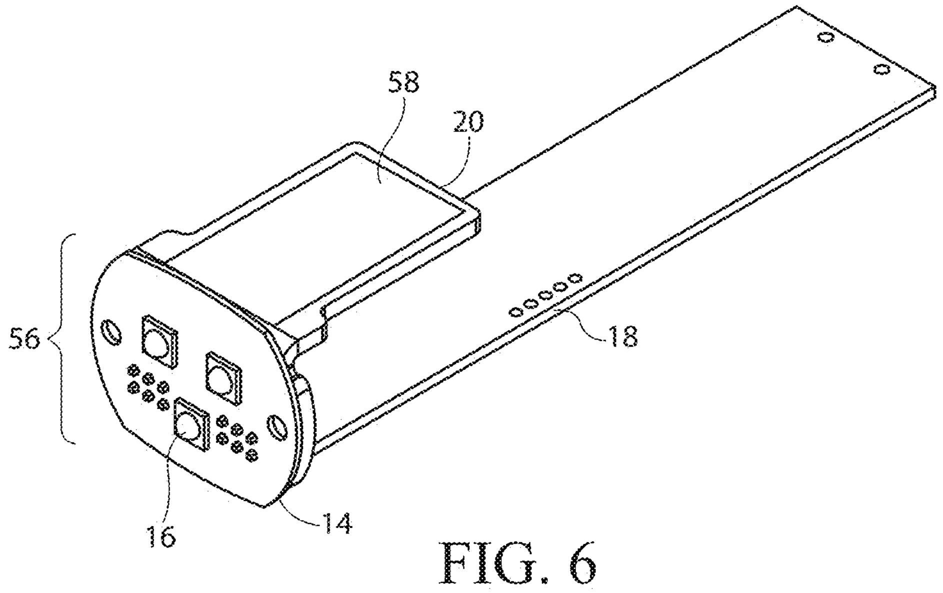
FIG. 6 is a rear perspective view of the display board, driver board and heat sink subassembly of the nicheless light of FIG. 1.
Figure 7:
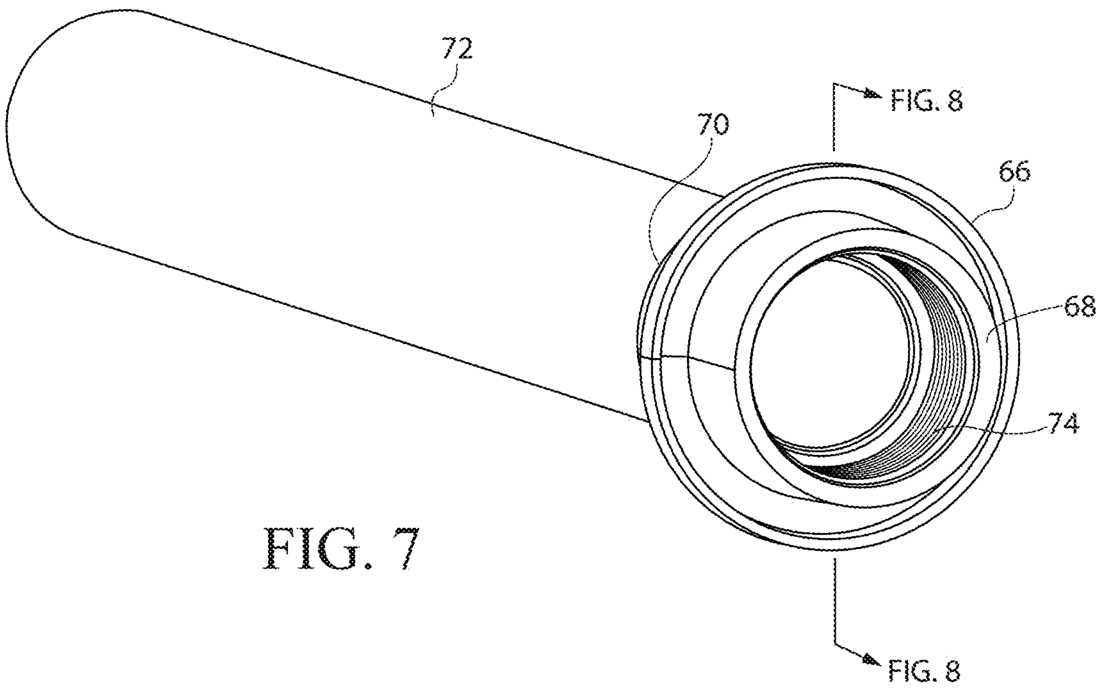
FIG. 7 is a perspective view of a pipe with a mounting adapter suitable for mounting the nicheless light of the present invention.
Figure 8:
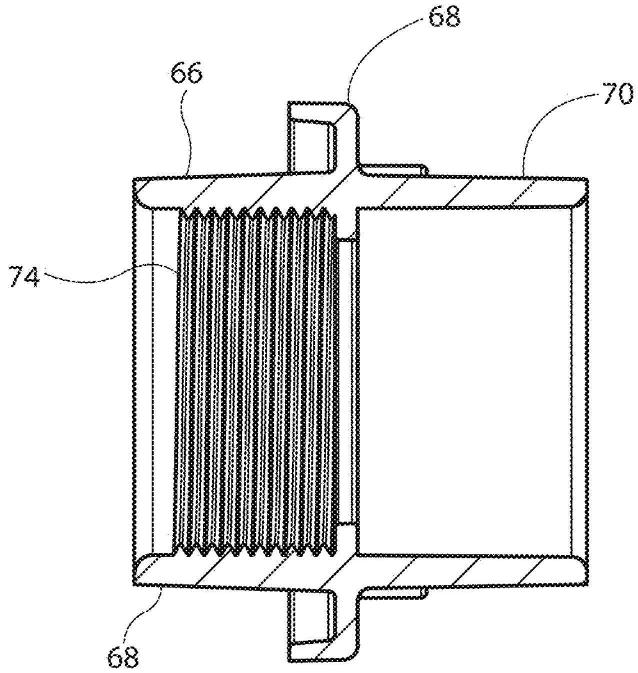
FIG. 8 is a cross-sectional view of the adapter of FIG. 7 taken along the line 8-8 of FIG. 7.
Figure 9:
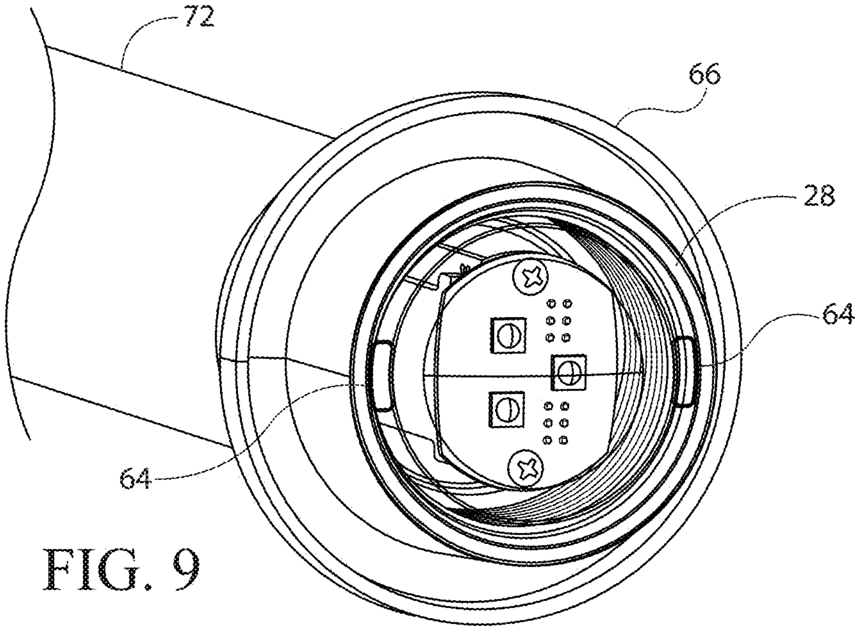
FIG. 9 is a perspective view of the nicheless light of the present invention installed in a pipe using the adapter shown in FIG. 8.
Figure 10:
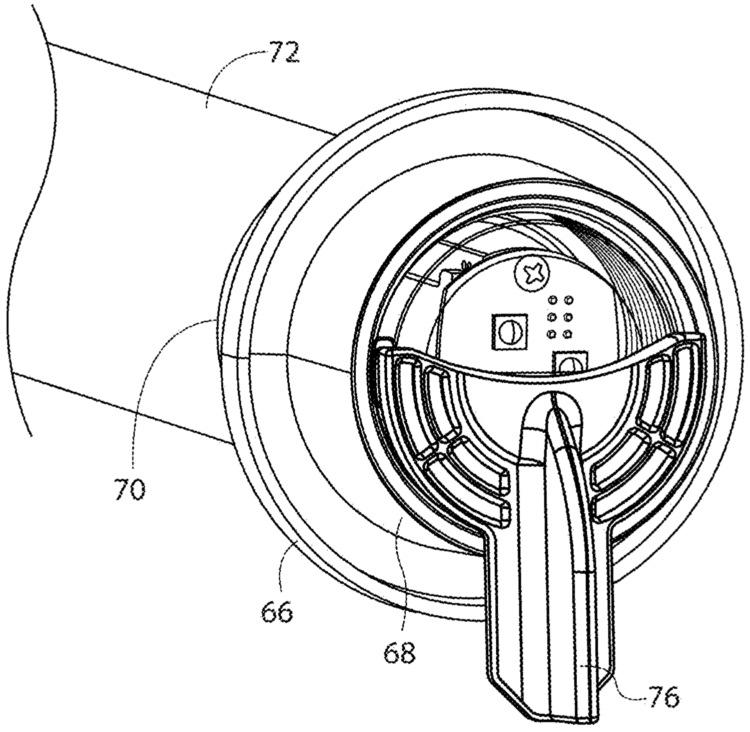
FIG. 10 is a perspective view of an installation tool suitable for installing and removing the nicheless light of the present invention from the adapter of FIG. 8.

With reference to FIGS. 1-6 and in particular, reference to FIGS. 5-6, the connection between the heat sink 20 and the display board 14 is shown. The heat sink 20 is configured as an angle element having flanges that join at a right angle. The heat sink 20 is bonded to the rear face 84 of display board 14 adjacent an edge 88 of the display board opposite the driver board 18. In the exemplary embodiment, the heat sink 20 is bonded using thermally conductive adhesive tape and is made from aluminum. Other metallic materials are also suitable. The packaging of the display board 14, driver board 18 and heat sink 20 results in an electronics assembly 56 which is especially compact.

With reference to FIGS. 1-6 and in particular, reference to FIG. 2, when the electronics assembly 56 is installed in the cavity 48 of the housing 12, an outer face 58 of the heat sink 20 abuts along its length the flat face 50 of one of the internal, heat sink portions 30. This abutment has been found to substantially improve heat transfer from the heat sink 20 to the internal, heat sink portion 30 and thereby improves the cooling capacity of the nicheless light 10.

Upon assembly, the housing 12 is fully filled with a thermally conductive, potting compound or encapsulant 34. The encapsulant 34 promotes thermal conduction from the display board 14, driver board 18 and heat sink 20 to the thermoplastic housing 12. Additionally, the encapsulant serves as a barrier against water ingress, enhancing the overall environmental protection of the electronics assembly 56. The encapsulant 34 may be a urethane, epoxy or silicone compound. Other compounds may also be suitable.

With reference to FIGS. 1-6 and in particular, reference to FIGS. 2 and 2B and 12-14, the housing 12 is configured with flats 60 at the front end 44 and the lens 28 is configured with flats 62. The lens 28 is configured to be a slip fit over the front end 44 of the housing 12 and consequently, the flats 62 of the lens slip over the flats 60 of the housing 12. The arrangement mechanically prevents the lens 28 from rotating about the housing 12. Upon assembly, the lens 28 is bonded to the housing 12. In the exemplary embodiment, bonding is accomplished by means of a waterproof adhesive. The lens 28 features a convex, outwardly facing surface 80 which provides an airgap 46 between an inwardly facing surface 82 of the lens and LEDs 16. The airgap 46 is used for optical lens focusing.

With reference to FIGS. 1-10 and in particular, reference to FIGS. 7-10 and 12-15, a fitting 66 for use in installing the nicheless light 10 to a pipe or conduit 72 is shown. The fitting 66 comprises a neck portion 70 and an adapter portion 68. The neck portion 70 is configured to be a slip fit with the outside diameter of the pipe 72 and, in the exemplary embodiment, is secured to the pipe 72 with an adhesive. The adapter portion 68 includes internal threading 74 which is configured to mate with the external threads 38 of the lens 28. The lens 28 includes sockets 64 for engagement with prongs 90 of an installation tool 76 which may be used to assist in installing or removing the nicheless light 10 from adapter portion 68 of the fitting 66.

Figure 11:
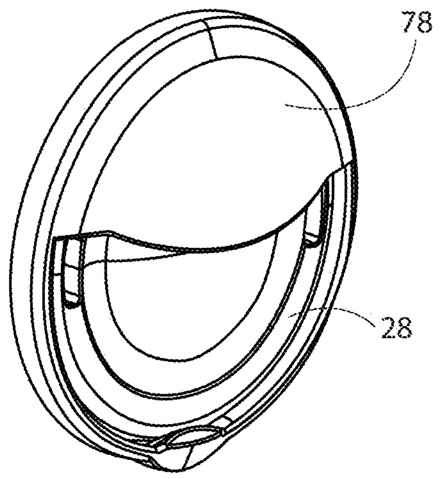
FIG. 11 is a perspective view of a shroud installed on the nicheless light of FIG. 1.
Figure 12:
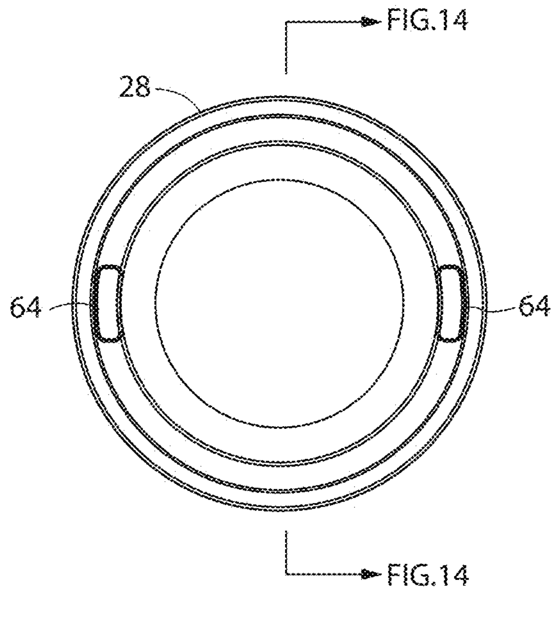
FIG. 12 is a front view of the lens of the nicheless light of FIG. 1.
Figure 13:
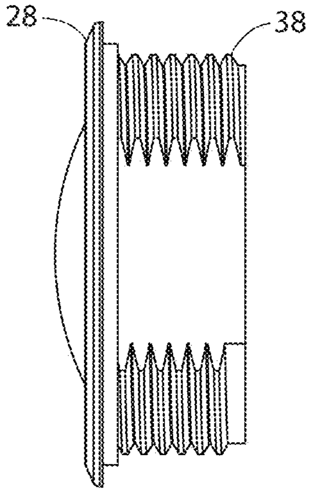
FIG. 13 is a side view of the lens of FIG. 12.
Figure 14:
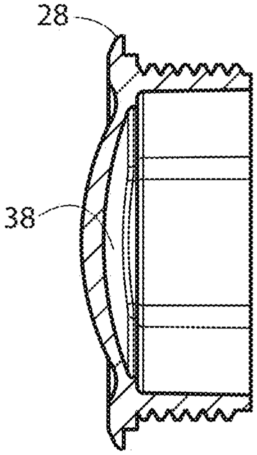
FIG. 14 is a cross-sectional view of the lens taken along the line 14-14 of FIG. 12.
Figure 15:
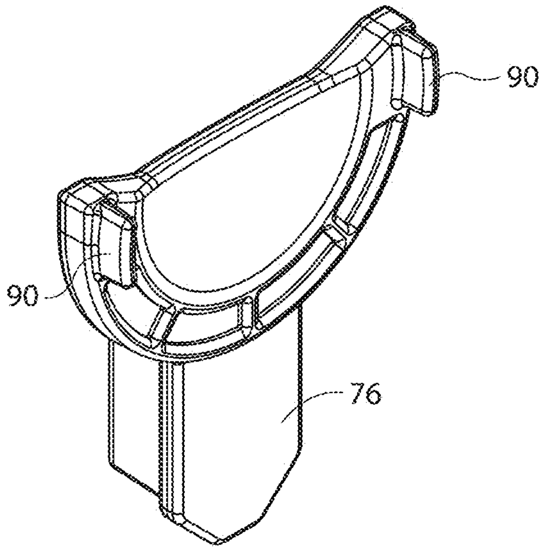
FIG. 15 is a perspective view of an installation tool configured for use in installing the nicheless light of the present invention.

With particular reference to FIG. 11, the nicheless light 10 may, optionally, be equipped with a shroud 78 to achieve specific lighting effects. In FIG. 11 a down-shroud is depicted, which directs light downwardly to illuminate features such as steps or the bottom surface of a pool generally. A set screw, (not shown), may be used to attach the shroud the light.

Once powered, the nicheless light 10 of the present invention provides accent illumination, decorative color effects, or general lighting. The device's compact size, combined with efficient thermal management and waterproof construction, allows for reliable operation within tight spatial constraints where traditional lighting fixtures cannot be used.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical. It is intended that the claims cover all such modifications and alternative embodiments.

The invention claimed is:

1. A submergible light comprising:

a housing, a display board, a driver board, a heat sink, one or more LEDs, a lens and an electrical connector element;

wherein the housing is elongated having an open interior with an open front end and an open rear end and an integrally formed internal heat sink portion;

wherein the one more LEDs are mounted on a front face of the display board;

wherein electronics for operating the one or more LEDs are mounted on the driver board;

wherein the driver board is connected to the display board such that the driver board extends perpendicularly from a rear face of the display board adjacent an edge of the display board;

wherein the heat sink is connected to the display board and extends perpendicularly from a rear face of the display board adjacent an edge of the display board opposite the driver board;

wherein the display board, driver board and heat sink are disposed in the housing such that a portion of the heat sink abuts the integrally formed internal heat sink of the housing and the one or more LEDs face outwardly of the open front end of the housing;

wherein the lens is configured to attach to the front end of the housing and seal the front end against water ingress; and wherein the electrical connector element is disposed in the rear end of the housing and supplies electrical power the driver board.

2. The submergible light of claim 1, further comprising a waterproof potting compound disposed within the housing to seal the housing against water ingress.

3. The submergible light of claim 1, wherein the lens has a concave surface and is configured to maintain an airgap between the display board and the concave surface.

4. The submergible light of claim 1, further including an fitting for mounting the submergible light in a pipe or conduit, wherein the fitting includes a neck portion for attachment to the pipe and an adapter portion for attachment to the submergible light.

5. The submergible light of claim 1, further including a shroud removably attachable to the lens.

6. The submergible light of claim 1, wherein the housing includes fluting on a portion of its external surface.

7. A submergible light comprising:

a housing, a display board, a driver board, a heat sink, and one or more light sources;

wherein the housing is elongated having an open interior with an open front end and an open rear end and an integrally formed internal heat sink portion;

wherein the one more light sources are mounted on a front face of the display board;

wherein electronics for operating the one or more light sources are mounted on the driver board;

wherein the driver board is connected to the display board such that the driver board extends perpendicularly from a rear face of the display board;

wherein the heat sink is connected to the display board and extends perpendicularly from a rear face of the display board; and wherein the display board, driver board and heat sink are disposed in the housing such that a portion of the heat sink abuts the integrally formed internal heat sink portion of the housing and the one or more light sources face outwardly of the open front end of the housing.

8. The submergible light of claim 7, further comprising a waterproof potting compound disposed within the housing to seal the housing against water ingress.

9. The submergible light of claim 7, wherein the driver board extends perpendicularly from the display board adjacent an edge of the display board and the heat sink extends perpendicular from the display board adjacent an opposite edge of the display board.

10. The submergible light of claim 7, further including a lens configured to attach to the open front end of the housing and seal the front end against water ingress.

11. The submergible light of claim 7, further including an electrical connector element disposed in the open rear end of the housing.

12. The submergible light of claim 10, wherein the lens has a concave surface.

13. The submergible light of claim 12, wherein the lens is configured to maintain and airgap between the display board and the concave surface.

14. The submergible light of claim 7, further including an fitting for mounting the submergible light in a pipe, wherein the fitting includes a neck portion for attachment to the pipe and an adapter portion for attachment to the submergible light.

15. The submergible light of claim 10, further including a shroud removably attachable to the lens.

16. The submergible light of claim 7, wherein the housing includes fluting on its external surface.

17. A light comprising:

a housing, a first circuit board, a second circuit board, a heat sink, and one or more light sources;

wherein the housing has an open interior with an open front end and an open rear end and an internal heat sink portion;

wherein the one more light sources are mounted on a front face of the first circuit board;

wherein electronics for operating the one or more light sources are mounted on the second circuit board;

wherein the second circuit board is connected to the first circuit board;

wherein the heat sink is connected to the first circuit board;

wherein the heat sink is disposed in the housing such that at least a portion of the heat sink abuts the internal heat sink portion of the housing; and wherein the second circuit board extends perpendicularly from the first circuit board adjacent an edge of the first circuit board and the heat sink extends perpendicular from the first circuit board adjacent an edge of the first circuit board opposite the second circuit board.

18. The submergible light of claim 15, further including a lens configured to attach to the open front end of the housing and seal the front end against water ingress.

19. The submergible light of claim 15, further including a connector element disposed in the open rear end of the housing.

* * * * *